United States Patent [19]

Finello

[11] Patent Number: 5,151,848
[45] Date of Patent: Sep. 29, 1992

[54] SUPERCAPACITOR

[75] Inventor: Duane Finello, Shalimar, Fla.

[73] Assignee: The United States of America as represented by The Secretary of The Air Force, Washington, D.C.

[21] Appl. No.: 573,935

[22] Filed: Aug. 24, 1990

[51] Int. Cl.⁵ .............................................. H01G 9/00
[52] U.S. Cl. ................................... 361/502; 361/523; 361/524; 361/504
[58] Field of Search ................ 361/502, 504, 523, 524

[56] References Cited

U.S. PATENT DOCUMENTS

| | | | |
|---|---|---|---|
| 4,244,802 | 1/1981 | Pohto et al. | 204/252 |
| 4,389,289 | 6/1983 | deNora | 204/128 |
| 4,568,434 | 2/1986 | Morris et al. | 204/98 |
| 4,581,114 | 4/1986 | Morris et al. | 204/267 |
| 4,604,171 | 8/1986 | Morris et al. | 204/98 |
| 4,683,639 | 8/1987 | Maesaka et al. | 361/523 |
| 4,857,414 | 8/1989 | Araki et al. | 428/612 |
| 4,942,501 | 7/1990 | MacFarlane et al. | 361/523 |

Primary Examiner—Tod R. Swann
Attorney, Agent, or Firm—Stanton E. Collier; Donald J. Singer

[57] ABSTRACT

The invention is a supercapacitor cell having electrode plates of titanium coated with ruthenia impregnated with the solid polymer electrolyte perfluorosulfonic acid. The impregnation is carried out in a high pressure shock apparatus.

8 Claims, 2 Drawing Sheets

SUPERCAPACITOR

STATEMENT OF GOVERNMENT INTEREST

The invention described herein may be manufactured and used by or for the Government for governmental purposes without the payment of any royalty thereon.

BACKGROUND OF THE INVENTION

The present invention relates to energy storage devices, and, in particular, relates to capacitors and, more particularly, to supercapacitors.

It is a known fact that the capacitance is proportional to the plate area and inversely proportional to the distance the plates are apart in a parallel plate capacitor, for example; the energy density is proportional to the capacitance and inversely proportional to the volume between the plates. Thus in order to make a supercapacitor one would attempt to increase the capacitance and decrease the volume between the plates. The use of dielectric material further enhances the above characteristics.

In the past, the need for stored energy was provided by capacitor banks which proved to be bulky and more prone to failure. In applications having a need to minimize the amount of space used for energy storage, there is a need for a supercapacitor.

High energy density capacitors have high surface area electrodes and ion-mobile electrolyte instead of typical capacitor plates and dielectric. The electrode material is characterized by a fine microporous texture which is responsible for its high surface area and must be filled with electrolyte in order to gain access to a large portion of the available area.

With regard to capacitor construction, solid electrolyte has advantages over liquid electrolyte. But from a functional standpoint, use of liquid electrolyte is more straightforward. Liquid electrolytes are generally non-viscous at room temperature and readily wet the electrode surface. With liquid electrolyte, gaining access to the total electrode surface is often no major problem. However, a more elaborate set of procedures is required if solid electrolyte is to be used. An electrode impregnation process must be employed for effective utilization of the total surface area, yet the process must not have adverse effects upon electrolyte quality.

SUMMARY OF THE INVENTION

The present invention provides a process to make supercapacitors with solid polymer electrolyte therein.

A pair of titanium electrodes coated with ruthenia are placed about a membrane of hydrated perfluororsulfonic acid. This sandwich is then placed in a high pressure shock apparatus which applies the shock to the sandwich. The solid polymer electrolyte is impregnated into the porous electrodes by the shock. The resulting single cell supercapacitor has an energy density of about 0.2 joules per cubic centimeter.

It is therefore one object of the present invention to provide a supercapacitor.

Another object of the present invention is to provide a supercapacitor having an energy density of about 100 times that of a conventional capacitor.

Another object of the present invention is to provide a process of making a supercapacitor with a solid polymer electrolyte therein.

These and many other objects and advantages of the present invention will be readily apparent to one skilled in the pertinent art from the following detailed description of a preferred embodiment of the invention and the related drawings.

DESCRIPTION OF THE PREFERRED EMBODIMENT

Figure 1:
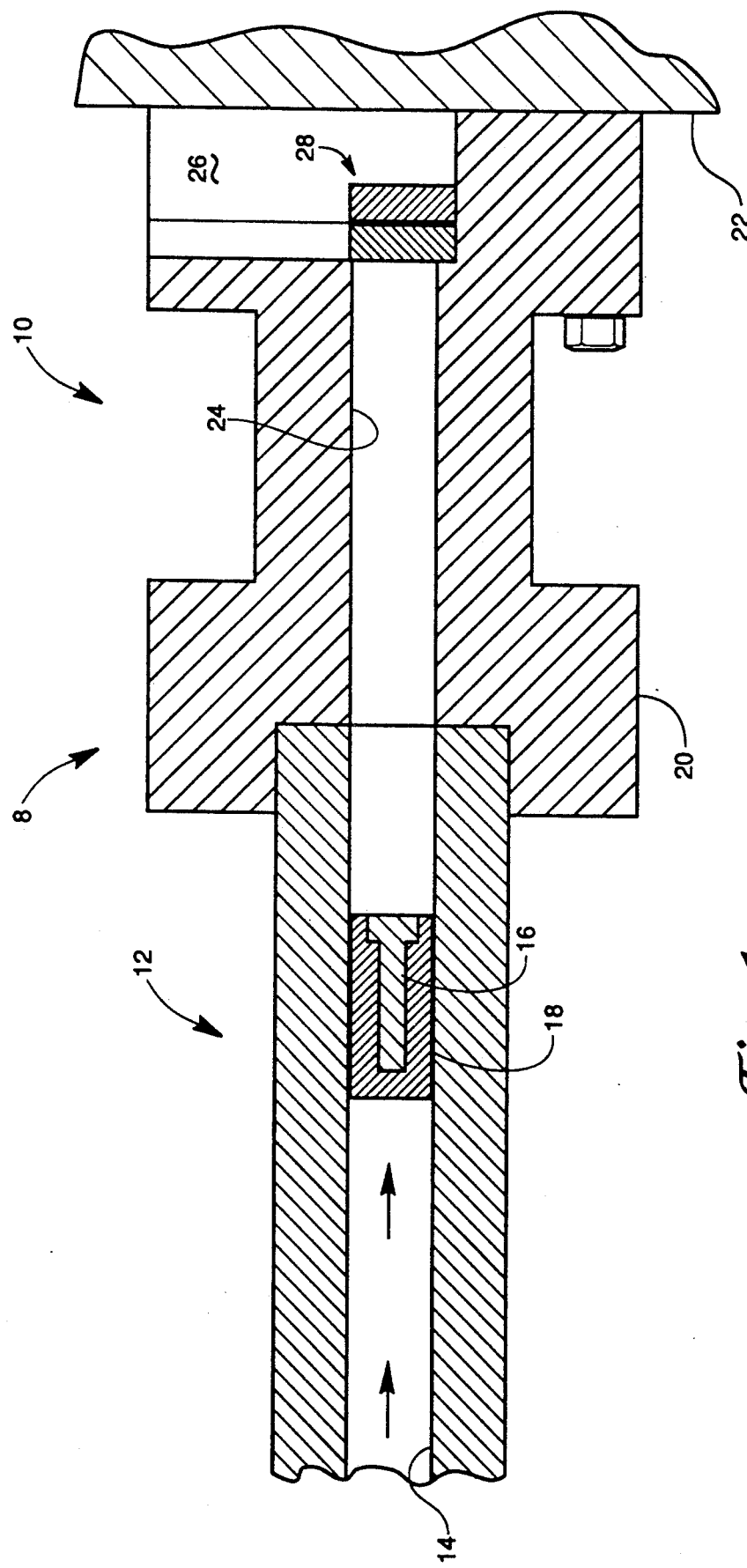
FIG. 1 illustrates by cross section the high pressure shock apparatus.

Referring to FIG. 1, a high pressure shock apparatus 8 is shown. A laminate forming fixture 10 is shown mounted on a muzzle 12 of a 30 mm. smooth bore gun, not otherwise shown and considered conventional. A bore 14 of the gun is shown having a projectile 16 with a plastic sabot 18 thereabout. Various projectiles 16 may thus be used.

Figure 2:
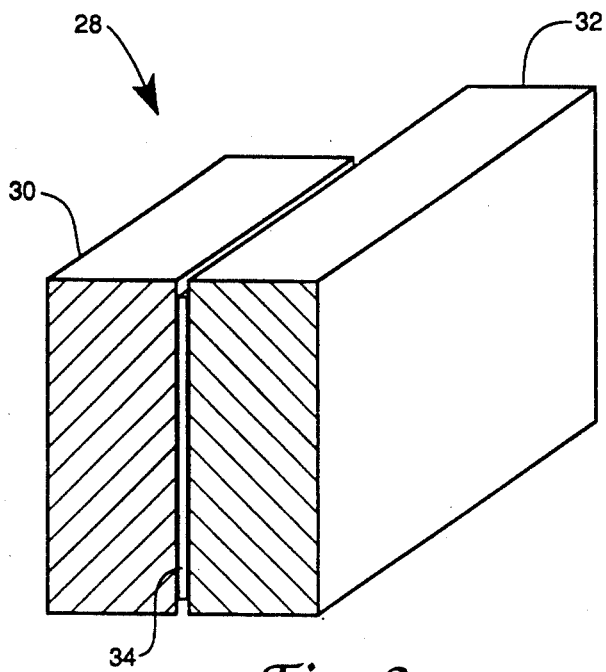
FIG. 2 illustrates the device for holding the sandwich of supercapacitor materials.
Figure 3:
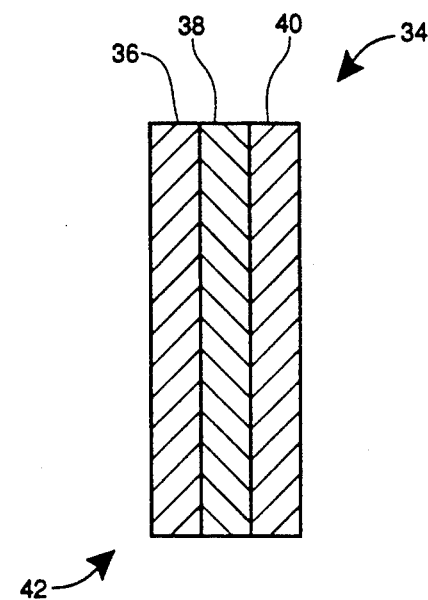
FIG. 3 illustrates the sandwich of the supercapacitor materials.

The laminate forming fixture 10 has a housing 20 having one end attached to the muzzle 12 and the other end attached to a massive object 22. The housing 20 has also a smooth bore 24 congruent with the bore 14 of the gun which ends in a receiving chamber 26 having a holder 28, further illustrated in FIG. 2. Holder 28, shown in half cross-section, has a first wall 30 and a second wall 32 with capacitor materials 34 therebetween. The capacitor materials 34, FIG. 3 before impact, are a sandwich 42 of a plate 36, a solid electrolyte layer 38 and a plate 40. The walls 30 and 32 are held together by guide rods, bolts, etc, not shown.

A selected powder load in the gun sends the projectile 16 into the bore 24 of the housing 20 and then into the first wall 30 of the holder 28. The holder 28 then slams into the massive object 22 and as a result of the pressure exerted on the capacitor materials 34, the solid electrolyte layer 38 is impregnated into the porous plates 36 and 40.

IMPREGNATION PROCEDURES

Figure 4:
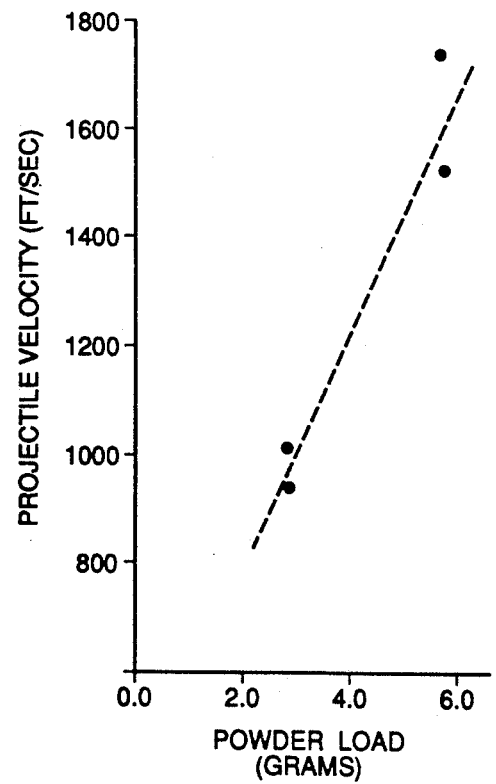
FIG. 4 is a chart of the gun load versus the velocity of the projectile in the high pressure shock apparatus.

Using Bullseye gun powder and a set of four 0.12 kg projectiles 16, the dependence of projectile velocity upon powder load was determined, FIG. 4. To obtain a standard projectile velocity of approximately 1000 ft/s (1100 km/hr), a powder load of 3.2 g was chosen. The pressure exerted upon the holder 28 during projectile impact was not measured directly, but it is estimated that pressures in excess of one kilobar (0.1 GPa) can be achieved.

The sandwich 42 was made by placing the layer 38 of hydrated nafion electrolyte, originally of 7 mil (0.18 mm) thickness, between a pair of titanium electrode plates 36 coated with high surface area ruthenia and 40 having a 1.9 cm diameter. Each electrode was 4 mil (0.10 mm) thick. Next, the sandwich 42 was held in position between the two walls 30 and 32 of the holder 28, which was then bolted together and inserted in the fixture 10. Alignment of the bore of the gun barrel with the center of the holder 28 was not a problem because of the nylon sabot 18 used to sheath the projectile 16 and also due to the care taken in fabricating the fixture 10 and the holder 28.

After the gun was loaded and discharged, the holder 28 was removed from the fixture 10 and the supercapacitor cell withdrawn. Physical characterization of the cell was performed and measurements of capacitance and equivalent series resistance were recorded. For the electronic measurements a pair of freshly abraded strips of 0.1 mm thick copper sheet having 5 mm² area was used for contacts in a small pinch clamp insulated with strips of fiberglass sheet.

To measure the large capacitance of the supercapacitor, a coulometer protected by a current limiting resistor can be used. The capacitor was connected to a constant voltage source for 5 minutes to enable it to equilibrate to a stable charge. The capacitor was disconnected from the source and connected to a coulometer to measure the amount of charge stored in units of coulombs. A Princeton Applied Research Model 379 Digital Coulometer protected with a 120 ohm current limiting resistor was used for the charge measurement. Capacitance (in units of farads) was calculated simply by dividing the charge by the source voltage.

The equivalent series resistance (ESR), the "internal resistance" of a capacitor, limits its rate of charge and discharge. ESR measurement was performed directly using a GenRAD Model 1658 RLC Digibridge at a frequency setting of 1 KHz.

Results of capacitance measurements are shown in Table 1. For a potential of 1.0 volt, a capacitance of 0.18 farad was measured. It was originally thought that the upper operating limit was 1.2 volts, the potential for electrolysis of water. However, it was found that the laminated cell could hold a potential of up to 1.65 volts without draining an uncontrolled amount of current.

The ESR measured for the laminated cell was 9.5 ohms. The ESR increased over a period of 5 months to a value of 23 ohms. Rather than decrease over time due to the absorption of water, the ESR increased over time and this reflects a tendency of the electroltye to dry with age.

TABLE 1
MEASUREMENTS OF CAPACITANCE AND CHARGE VERSUS VOLTAGE

| Voltage (Volts) | Charge (Coulombs) | Capacitance (Farads) |
|---|---|---|
| 0.50 | .067 | .13 |
| 0.75 | .116 | .15 |
| 1.0 | .181 | .18 |
| 1.2 | .250 | .21 |
| 1.6 | .264 | .17 |

The densification of the polymer occurred during the high pressure process. The densificaton and electrolyte shrinkage is accompanied by some reduction in electrolyte conductivity since much of the water (the source of $H^+$ ions) is driven out of the membrane as its micropore content is diminished.

The ionic conductivity of hydrated nafion membrane in relation to the volume fraction of water $(1-T)$ is given by the expression:

$$K = 0.54 C (1-T)^{1.5}$$

where C is assumed to be the specific conductivity of 0.9 molar (8.8 wt percent) $H_2SO_4$. The value of C can be determined from battery acid charts. The conductivity of the densified nafion with an ESR of 10 ohms, $5 \times 10^{-3}$ cm thickness and 2.8 cm² area is given by $$\begin{aligned} K &= \text{thickness}/(\text{ESR} \cdot \text{Area}) \\ &= (1/10 \text{ ohms}) * (5 \times 10^{-3} \text{cm}/2.8 \text{ cm}^2) = \\ &\quad 1.8 \times 10^{-4} \text{mhocm}^{-1} \\ \text{so } K/0.54 \, C &= (1.8 \times 10^{-4})/(0.3 \times 0.54) = 1.1 \times 10^{-3} \\ \text{and } 1\text{-}T &= 0.01 \end{aligned}$$

Therefore, the fraction of water in the dense nafion is only 1 percent by volume.

This observation is consistent with the ability to operate the capacitor well in excess of 1.2 volts. The $SO_3-$ sulfonic acid groups are primarily responsible for the ionic conductivity of the electrolyte and that $H^+$ ions do not play a significant role. In fact, the tendency for the capacitor to dry out over time is not seriously impairing its performance (although the ESR has doubled) because the sulfonic acid groups still remain within the polymer.

From the above, it is seen that high pressure shock processing is applicable to the problem of impregnating high surface area electrodes with solid polymer electrolyte in order to make useful capacitors. The improvement over conventional capacitors is shown in Table 2. The complications associated with this are noteworthy, yet the potential for applying the technique to lithium ion conducting polymer electrolytes is substantial. The electrolyte densification which accompanies the high pressure lamination process is expected to squeeze out liquid phases present in the microporous membranes, along with the $H+$ ions and other species dissolved in the liquid phase. However, it is unlikely to affect those mobile ions which rely upon transport mechanisms within the bulk of the solid polymer. Ion transport along interior surfaces of pores may become impossible as the network is densified, yet indications are that the overall contributions to the conductivity from this type of transport can be neglected altogether.

TABLE 2
POLYMER ELECTROLYTE VERUS CONVENTIONAL LOW VOLTAGE CAPACITORS
(10-volt working voltage was chosen for comparison)

| Capacitor Type | Energy Density (J/cc) |
|---|---|
| Tantalum Slug | 0.02 |
| Electrolytic | 0.01 |
| Metallized film | 0.001 |
| Polymer Electrolyte | |
| Present: 1 v/cell | 0.18 |
| Projected: 3.3 v/cell | 1.7 |

Clearly, many modifications and variations of the present invention are possible in light of the above teachings and it is therefore understood, that within the scope of the inventive concept, the invention may be practiced otherwise than specifically claimed.

What is claimed is:

1. A supercapacitor, said supercapacitor comprising:
   a first plate, said first plate having a porous surface;
   a second plate, said second plate having a porous surface;
   a solid polymer electrolyte, said solid polymer electrolyte impregnated into the porous surface of said first and said second plate;
   means for electrically connecting to said plates; and
   means for housing said plates with said solid polymer electrolyte therein and said means for electrically connecting, said supercapacitor having an energy density ranging from 0.1 to 2.0 joules per cubic centimeter.

2. A supercapacitor as defined in claim 1 wherein said plates are composed of titanium coated with high surface area ruthenia.

3. A supercapacitor as defined in claim 1 wherein said solid polymer electrolyte is perfluorosulfonic acid.

4. A process of making a supercapacitor cell, said process comprising the steps of:

assembling a sandwich of at least one pair of plates and a layer of solid polymer electrolyte between each pair of plates;

placing said sandwich in a receiving chamber of a means for providing a high pressure shock wave to said receiving chamber;

applying sufficient high pressure to cause said solid polymer electrolyte to impregnate into said plates; and removing said supercapacitor cell from said receiving chamber after applying said sufficient high pressure.

5. A process as defined in claim 4 wherein said plates comprise titanium coated with high surface area ruthenia.

6. A process as defined in claim 5 wherein said solid polymer electrolyte comprises perfluorosulfonic acid.

7. A process as defined in claim 5 wherein said sufficient pressure is about one kilobar.

8. A process as defined in claim 5 wherein said supercapacitor cell has an energy density of about 0.1 to about 2.0 joules per cubic centimeter.

* * * * *